United States Patent [19]

Yengst

[11] 3,942,909
[45] Mar. 9, 1976

[54] VERTICAL AXIS FLUID DRIVEN ROTOR
[75] Inventor: William C. Yengst, Solana Beach, Calif.
[73] Assignee: Science Applications, Inc., La Jolla, Calif.
[22] Filed: July 22, 1974
[21] Appl. No.: 490,365

[52] U.S. Cl............... 416/132 B; 416/119; 416/139
[51] Int. Cl.²............................................ F03D 7/06
[58] Field of Search............ 416/139, 111, 117–119, 416/132, 41, 40, 53, 50, 51

[56] References Cited
UNITED STATES PATENTS

| | | | |
|---|---|---|---|
| 1,341,045 | 5/1920 | Currey | 416/119 X |
| 1,646,673 | 10/1927 | Wilson | 416/197 X |
| 1,697,574 | 1/1929 | Savonius | 416/132 X |
| 1,766,765 | 6/1930 | Savonius | 416/132 |
| 1,824,336 | 9/1931 | Michot-DuPont | 416/53 |
| 1,952,800 | 3/1934 | Havill | 416/139 X |
| 1,954,811 | 4/1934 | Gunn | 416/132 |
| 3,093,194 | 6/1963 | Rusconi | 416/119 X |

FOREIGN PATENTS OR APPLICATIONS

| | | | |
|---|---|---|---|
| 103,819 | 7/1926 | Austria | 416/50 |
| 264,219 | 1927 | United Kingdom | 416/41 |

Primary Examiner—Everette A. Powell, Jr.
Attorney, Agent, or Firm—Bruno J. Verbeck

[57] ABSTRACT

A vertical axis wind-driven rotor which combines effective utilization of the energy in a strong wind with maintenance of effective torque at low wind speeds. In one embodiment, the rotor has a reservoir of liquid located near its base. A plurality of tubes radiate outwardly from the reservoir along the base, then rise upwardly along the outer edges of the rotor vanes. In another embodiment, a Savonius type rotor is modified so that the vanes are hinged, and the trailing edge of each vane weighted, whereby in a wind the rotor starts in a fully open condition and automatically feathers itself at high wind speeds.

2 Claims, 13 Drawing Figures

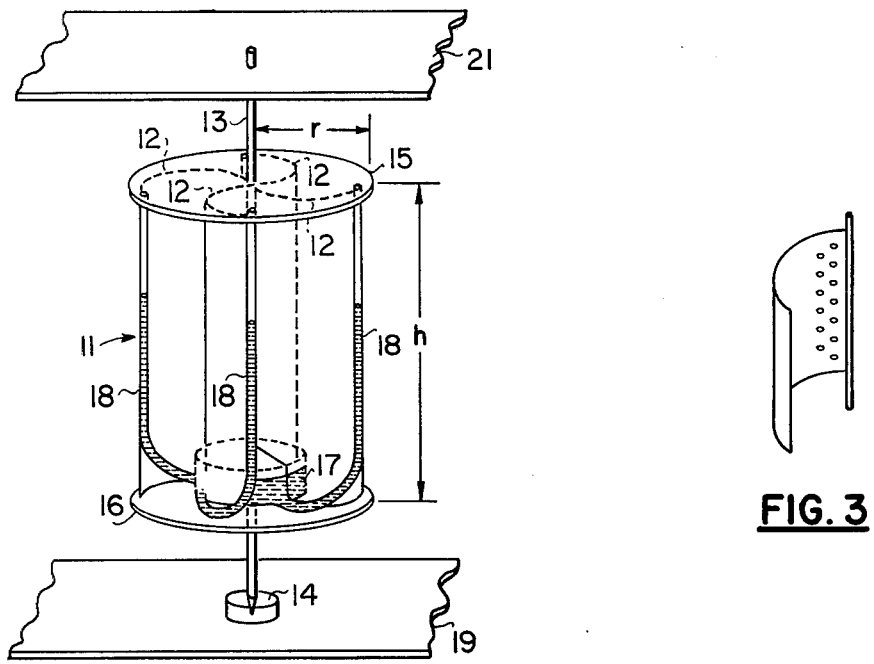
FIG. 1
FIG. 3
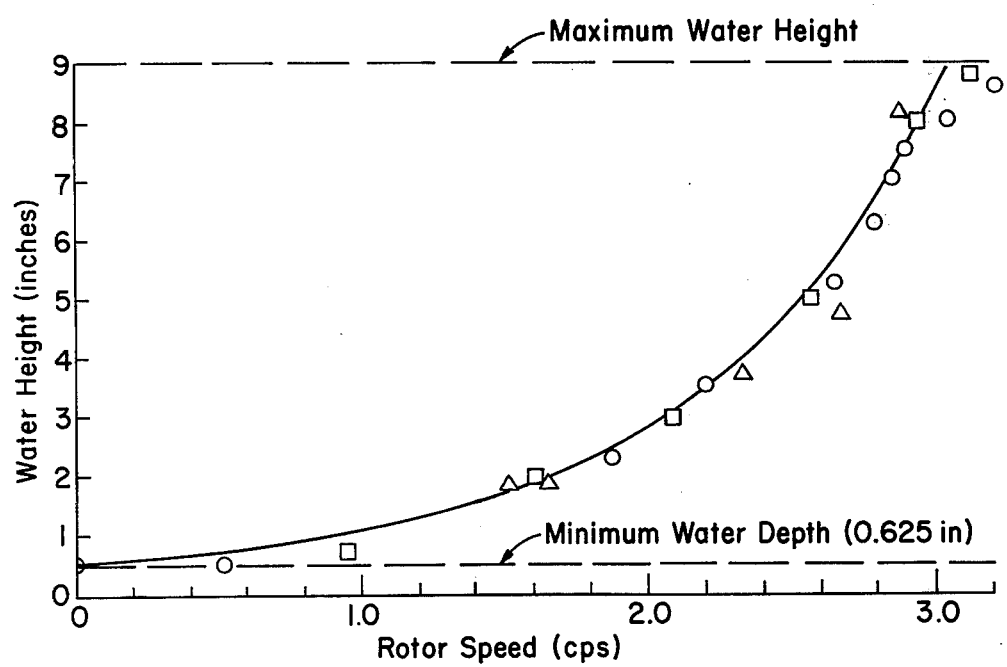
FIG. 2

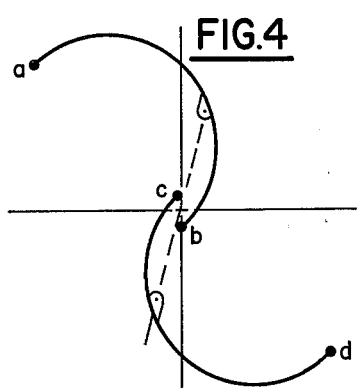
FIG. 4
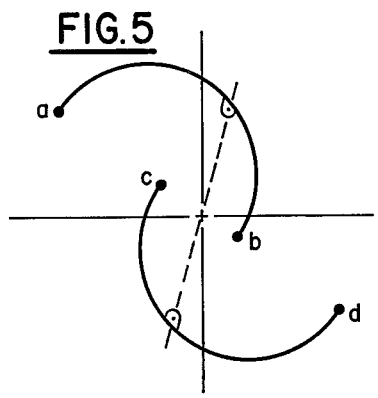
FIG. 5
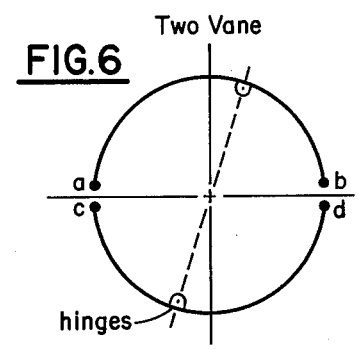
FIG. 6 Two Vane
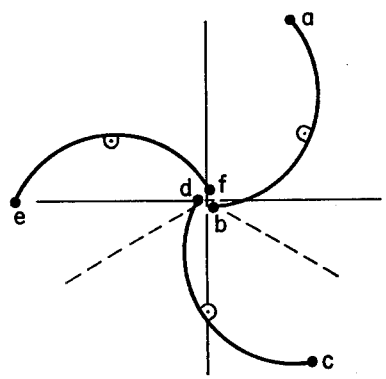
Low Wind
FIG. 7
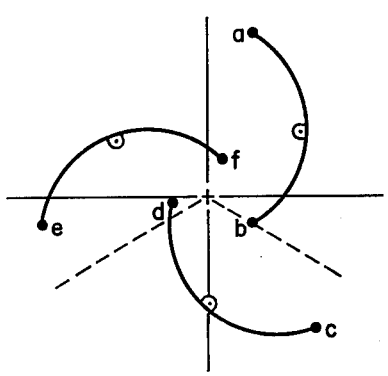
Moderate Wind
FIG. 8
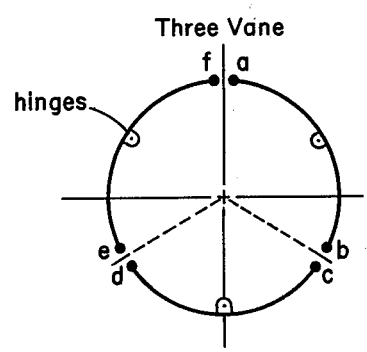
Extremely High Wind
FIG. 9 Three Vane
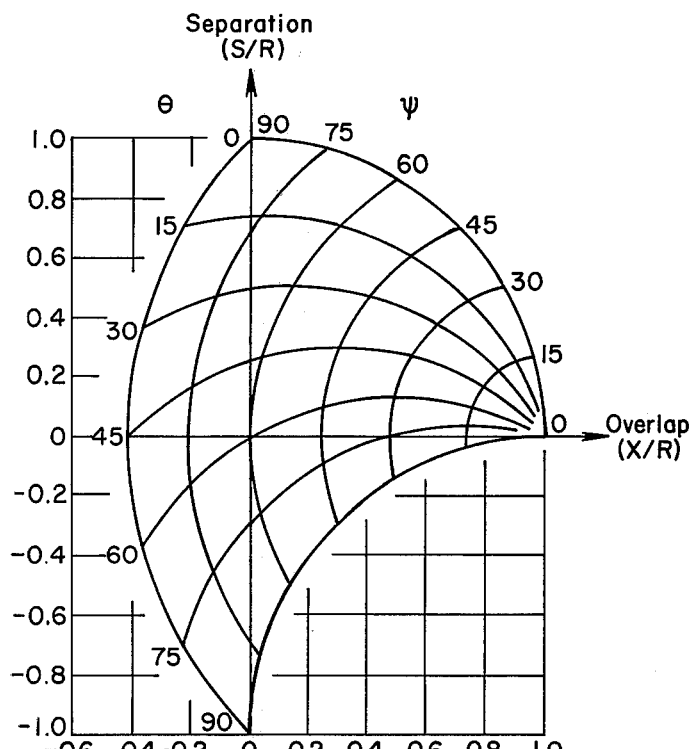
FIG. 10
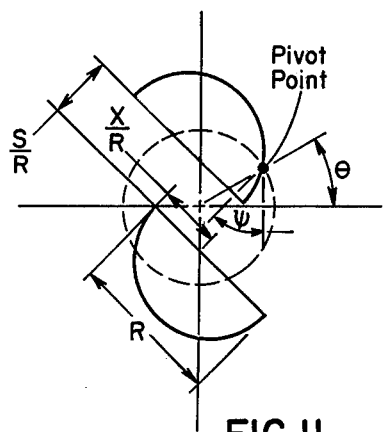
FIG. 11

VERTICAL AXIS FLUID DRIVEN ROTOR

BACKGROUND OF THE INVENTION

1. Field of the Invention

This invention relates to a vertical axis variable configuration rotor. Rotors of this general type which will be hereinafter referred to as "S-Rotors", are typified by those described for example, in U.S. Pat. No. 1,697,574, to Savonius, issued Jan. 1, 1929. Such rotors in one form, consist of a vertical cylinder sliced in half from top to bottom, the two halves pulled apart, and overlapped by about 20% in their diameters. In principal, such a rotor, mounted on a vertical shaft, provides some recirculation of flow which in effect converts the cup, which is coming backwards into the wind, into the second stage of a two stage turbine.

While the S-Rotor has major advantages, such as those of operating equally well with wind coming from any direction and ability to start in very light winds compared to horizontal axis wind mills, these advantages have been offset by such problems as difficulty and expensiveness of regulation of angular velocity at the high wind speeds. It has become apparent that a new and unique concept had to be developed and the present invention is one resultant of our efforts toward that end. Our invention as further described in full detail hereinafter, includes as important characterizing features, combination of a vertical axis rotor and means for controlling rotor speed when flow of fluid operating the rotor varies in intensity.

SUMMARY OF THE INVENTION

The invention provides a vertical axis wind driven rotor which combines effective utilization of the energy in a strong wind with maintenance of effective torque at low wind speeds. In one illustrative embodiment a vertical axis wind driven rotor has a reservoir of liquid located near its base. A plurality of tubes radiate outwardly from the reservoir along the base, then rise outwardly along the outer edges of the rotor vanes. In another embodiment, a rotor, also of the Savonius type, is modified so that the vanes are pivoted, hinged, and the trailing edge of each vane weighted, whereby the rotor starts in any wind in a fully open condition, and automatically feathers itself (i.e., the vanes close upon each other to from a right cylinder) as the wind speed increases.

BRIEF DESCRIPTION OF THE DRAWINGS

FIG. 1 is a view in perspective, partly cut away, of one embodiment of a rotor construction according to our invention;

FIG. 2 is a graph depicting the liquid height in the tubes of the rotor of FIG. 1 plotted against the rotor speed;

FIG. 3 shows a vane of rotor which contains performations to facilitate feathering;

FIGS. 4, 5 and 6 show feathering of a two vane rotor utilizing pivoted vanes in low, moderate and high speed winds;

FIGS. 7, 8 and 9 show vane feathering of three vane rotor utilizing pivoted vanes in low, moderate and high speed winds;

FIG. 10 shows the relationship of overlap and separation for a two vane automatic vane feathering rotor;

FIG. 11 illustrates possible pivot point locations for a two vane rotor in terms of the resulting vane overlap and separation;

DESCRIPTION OF THE PREFERRED EMBODIMENT

Figure 12:
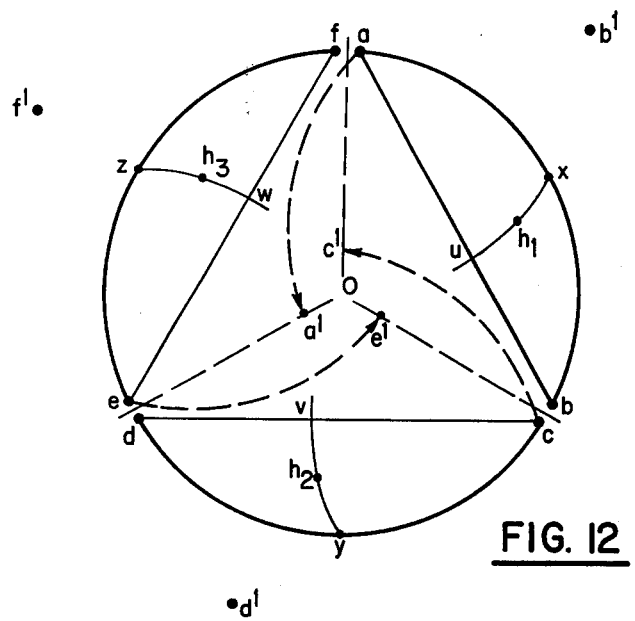
FIG. 12 illustrates the geometry for a three vane feathered rotor.

Referring now to the drawings, the rotor 11, of FIG. 1, comprises four semi-circular cross-section vanes 12 of metal, plastic or any suitable material, secured to a shaft 13. The bottom of the shaft 13 rests on a suitable bearing 14. End plates 15 & 16, through which the shaft 13 extends and is secured thereto, are also secured to the top and bottom edges of the vanes 12. A reservoir 17 has a lid (not shown), and is attached to and rotates with shaft 13. Leading outwardly from the reservoir 17 are tubes 18 which are positioned as shown and suitably secured to the rotor vanes 12 along the outer edges thereof, the tubes 18 terminating at the top of the vanes 12. The rotor construction is positioned on a base 19 the top of the shaft 13 being positioned as shown, protruding through an upper support member 21 to permit rotation of the shaft 13. In use, the reservoir is filled as required with a suitable liquid, such as water. When the rotor 11 is at rest, gravity maintains all of the liquid in the lower part of the tubes 18 and the reservoir 17 close to the shaft 13, thereby minimizing the rotor inertia. When wind or other driving sources of energy cause the rotor to turn, centrifugal force causes the liquid to run out of the reservoir 17 and up the tubes 18. As rotor speed increases, the liquid climbs upwardly in the vertical tubes 18 with the resulting weight of liquid equal to the centrifugal force at the base of each tube 18. When the tubes 18 are full, centrifugal force holds the liquid therein, but the inertia of the rotor 11 has been increased by the weight of liquid moved to the edges of the vanes 12. If the wind should drop and the rotor begins to slow down, gravity automatically returns the liquid back to the central reservoir 17. This reduction in inertia tends to maintain the rotor speed similar to the action of an ice skater increasing spinning speed by pulling in his arms.

In tests we have conducted, we have measured the height of the liquid in tubes 18 as a function of rotor speed. The theoretical height of the liquid of the vertical tubes is given by the following equation:

$$h = h_o + \frac{w^2}{6g}[3r^2 - r_R^2] \qquad (1)$$

where:
$h_o$ = initial height of water in the reservoir and tubes
$w$ = rotor speed in radians per second
$g$ = gravitational constant
$r$ = rotor radius
$r_R$ = reservoir radius FIG. 2 shows the results of the water height tests compared with the above equation and are seen to provide adequate confirmation of the equation. Small differences are due to imperfections in contruction, such as curved rather than right angle joints in the tubes.

It has further been determined that the initial inertia of our rotor 11 is higher than that of a conventional vertical axis rotor that does not include a reservoir, associated plumbing and accordingly, our rotor will not start or accelerate as easily as a conventional S-Rotor.

At very low rotor speeds, the energy of the aforesaid rotor is given by the following equation:

$$E_i = \tfrac{1}{2} I_i w_i^2 = n_i E_{wi} \qquad 2$$

where:
$E_i$ = rotor initial energy
$I_i$ = initial inertia
$w_i$ = initial rotational speed
$n_i$ = initial efficiency
$E_{wi}$ = energy available in the wind (or other source)

At high wind speed, the rotor reaches a final rotational velocity and Equation 2 can be rewritten as Equation 3.

$$E_f = \tfrac{1}{2} I_f w_f^2 = \tfrac{1}{2} (I_i + \Delta I) w_f^2 = n_f E_{wf} \qquad (3)$$

Dividing Equation 3 by 2 yields:

$$\frac{E_f}{E_i} = \frac{n_f E_{wf}}{n_i E_{wi}} = \frac{(I_i + \Delta I) w_f^2}{I_i w_i^2} \text{ or}$$

$$\frac{E_{wf}}{E_{wi}} = \left(\frac{n_i}{n_f}\right)\left(1 + \frac{\Delta I}{I_i}\right)\left(\frac{w_f}{w_i}\right)^2 \qquad (4)$$

It is understood, of course, that this equation is only valid over a limited range of its perameters, and that neither of the efficiencies can exceed unity, nor can the maximum rotor speed be unlimited.

If there were no liquid in the reservoir, $\Delta I$ would be zero. Under such conditions the increase in wind energy must be accounted for in the increase in the rotor speed ratio or a decrease in efficiency.

Values of $$\left(\frac{\Delta I}{I_i}\right)$$

near unity are achieveable and with $$\left(\frac{\Delta I}{I_i}\right)$$

at unity, the dynamic range of energy the rotor can absorb before it reaches saturation speed will be increased by approximately 40%.

Not only does this illustrative embodiment of our improved rotor construction increase the energy storage capability at a given rotor speed over conventional rotors, but the liquid acts as a moving mass which automatically compensates for imbalances in design, and also smooths the response to gusts.

Variations in the constructions in our rotor are of course, within the scope of our invention, as those skilled in the art will recognize. Thus, in addition to optimizing $$\left(\frac{\Delta I}{I_i}\right),$$

check valves may be installed in the vertical tubes so that the rotor will respond more quickly to increases than to decreases in wind velocity, the rotor thus acting as a mechanical rectifier to extract a higher percentage of gusty wind energy.

A wide range of liquids having different densities can be used to further modify the inertia as for example, alcohol, glycerin, mercury and the like.

The reservoir can be formed in various shapes, the height and diameter being selected so as to optimize $$\left(\frac{\Delta I}{I_i}\right),$$

and the tubes may have various configurations, such as straight, semi-circular, intertwined spirals and invariable sections.

And of course, while we have illustrated our invention with the aforesaid embodiment by showing a rotor construction having four vanes, it will be understood that fewer or greater numbers of vanes may be used.

The embodiment of our invention illustrated in FIG. 4–13 is further described hereinafter as a rotor that automatically feathers itself at high wind speed, but has maximum vane cross-section and torque at low wind speeds. It too, is particularly useful in situations when an extremely high wind occurs. In prior art devices any wind that would impose loads that would exceed the design strength of a rotor was cause for locking or turning the unit so that the wind would not be effective. Increasing the strength of such rotors so as to take advantage of the high energy available in a strong wind increases the rotor's mass and inertia and results in lowering the efficiency in a light wind. The rotor construction described hereinafter is a new and unique improvement over the prior art in that regard.

Considering FIG. 4–9, the rotor is shown in an unfeathered, partly feathered and fully feathered condition as it would be in a low, moderate and extremely high wind.

The vanes are each pivoted, as shown, at a point or near their circumference so that while in a high wind the rotor is fully feathered, at lower wind speeds (shown as moderate wind speed), the vanes move open as illustrated. At very low wind speeds the vanes are forced fully open as shown. In FIG. 10, there is illustrated some of the possible pivot point locations for a two vane rotor in terms of the resulting vane overlap and separation.

If the inertia of the rotor is maximum when the vanes are fully extended and minimum when feathered, It is possible to place weights along the edges of the vanes inboard of the pivot points such that as the rotor speeds up, centrifugal force will cause these eadges to move outward until the vanes are closed.

The problem of opening the vanes when the wind drops is solved by using a series of springs in tension (or compression) between appropriate points on the various vanes. The spring constants are chosen so as to balance the inertia of the weights along the vane edges to provide the desired degree of vane opening versus rotor and wind speed.

Considering FIG. 12, the three vane rotor is divided into three 120° vanes denoted by a–b, c–d and e–f. The cords of each vane form a triangle between points a–f, b–c and d–e. The centerpoint of each vane is denoted by $x$, $y$ and $z$, respectively.

If the radius of the circle is $r$, it is possible to draw arcs centered at $a$, $b$ and $c$ with radius $r$, which being near $x$, $y$ and $z$ and cut the respective cords at $u$, $v$ and $w$. By selecting points along these arcs ($x$–$u$, $y$–$v$ and $v$–$w$), one can locate pivot positions for the three vanes such that various degrees of overlap exist when the vanes rotate. Thus, for example, if the pivots are placed at $x$, $y$ and $z$, no overlap occurs when points $a$, $c$ and $e$ rotate to the centerpoint, 0. At points, $u$, $v$ and $w$, the overlap at 0 is about 40% of the radius.

Where pivot points for the vanes are halfway along the arcs ($x$–$u$, $y$–$v$ and $z$–$w$), at the positions labeled $h_1$, $h_2$ and $h_3$, this provides about a 20% overlap at the center as illustrated by the dashed positions of the vane tips $a_1$, $c_1$ and $e_1$, the outer vane tips moving to points $b_1$, $d_1$ and $f_1$ when fully opened.

Figure 13:
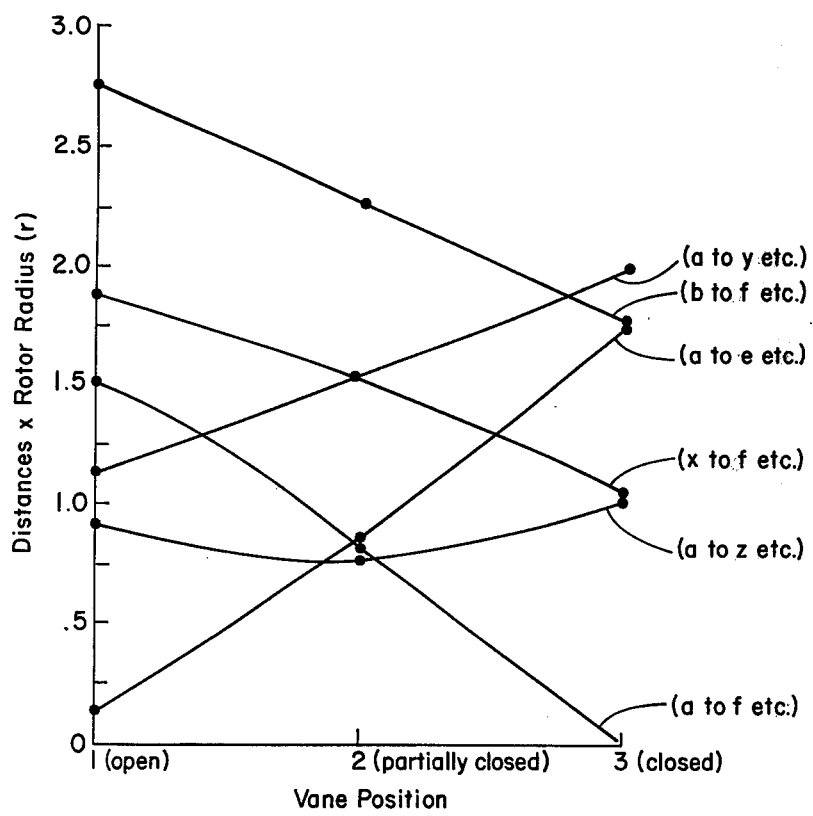
FIG. 13 shows a plot of relative distances between points on adjacent vanes of a three vane feathered rotor.

As the vanes rotate about their pivot points, $h_1$, $h_2$ and $h_3$) to open the rotor, the vane tips at $a$, $c$ and $e$ move closer together while tips $b$, $d$ and $f$ move further apart. One can place springs between respective points on the three vanes or between the vanes and their rotating reference plates to close the rotor as wind speed increases. Thus, consider the rotor shown in the three difference positions as in FIGS. 7–9. On the left, the rotor is fully opened, on the right, it is fully closed and in between, it is partially opened. Using these various positions, one can plot the relative distance between points between respective vanes as shown in FIG. 13. Consideration of FIG. 13 reveals that some of the relative distances increase, some remain nearly constant, (e.g., $x$, $y$ and $z$ are constant) and others decrease with position. Accordingly, it is possible to select a combination that pulls closed with higher speed and wind, using springs in tension. In a similar manner, springs in compression between points ($a$ to $f$, etc.) or ($x$ to $f$, etc.) will also force the rotor open at low rotor and wind speeds.

In sum, the foregoing shows that wide variety of pivot positions can be selected to control the overlap and spacing of rotor vanes in the fully open condition. This is true for rotors with any number of vanes. Secondly, the vanes can be feathered to a fully closed (cylindrical) condition by placing weights along their inner edges and allowing centrifugal force of rotation to move these edges out to their circumference. Finally, the vanes can be returned automatically to their fully open condition by using a series of springs in tension (or compression) between appropriate points on the vanes. The spring constants can be selected as desired to balance the vane inertia at any selected rotational speed in order to regulate the degree of vane opening inversely proportional to rotor and wind speed.

It is understood, of course, that in use, our rotor would generally be connected to a generator pump or other device through suitable coupling means. Thus the rotor shaft may be coupled to a generator shaft through any suitable friction clutch. (E.q., the rotor shaft may be coupled to a generator shaft through fluid transmission means, gearing or other suitable connection of the rotor shaft.)

And it will also be understood by those skilled in the art, that many modifications may be made in our invention without departure from the scope thereof.

We claim:

1. A vertical axis rotor comprising curved vanes overlapping in their diameters and attached to a shaft, a pair of spaced-apart end plates adapted to hold and permit rotation of the shaft to which said vanes are attached, and means for weighting an edge of said vanes comprising a plurality of tubes, each tube being positioned along the outer edge of each vane and connected to a source of liquid so that as the shaft and vanes rotate, fluid rises in said tubes.

2. The rotor of claim 1 wherein the said source of fluid is a reservoir near the base of the rotor.

* * * * *